Dec. 11, 1962 S. LOOSLI 3,067,858
MOBILE CONVEYING APPARATUS FOR PILING OR
STACKING COMMODITIES
Filed May 1, 1961 5 Sheets-Sheet 2

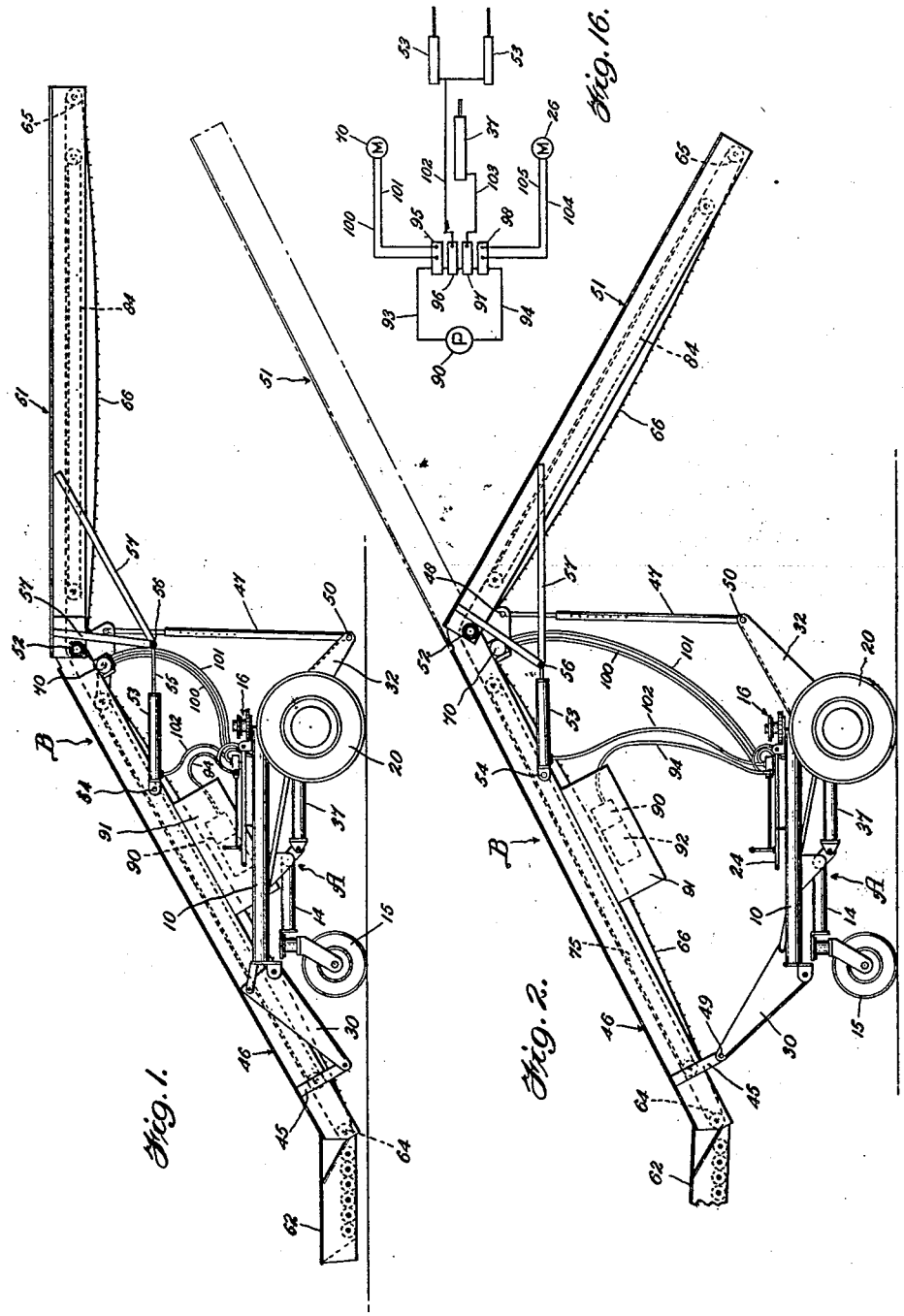

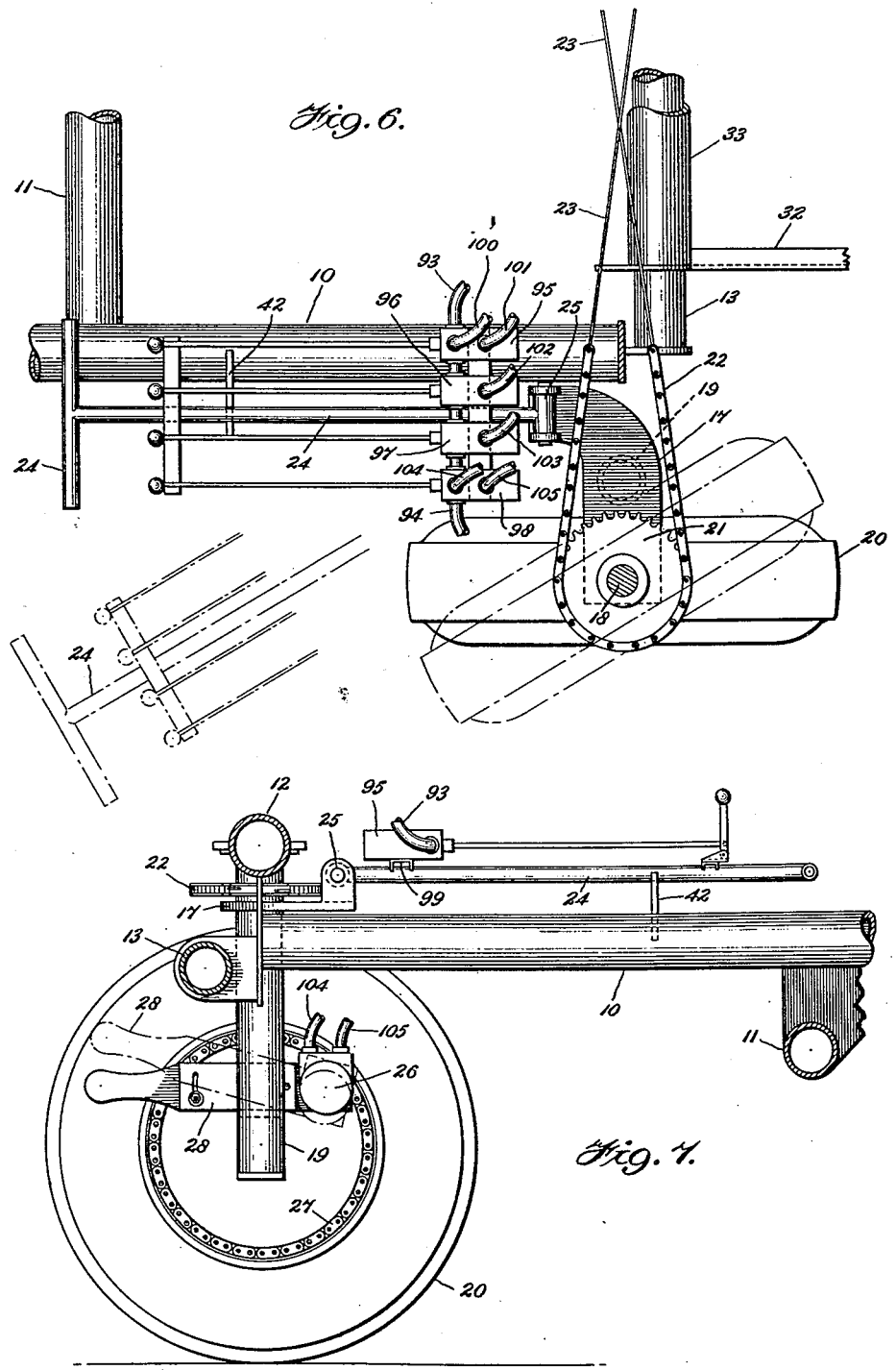

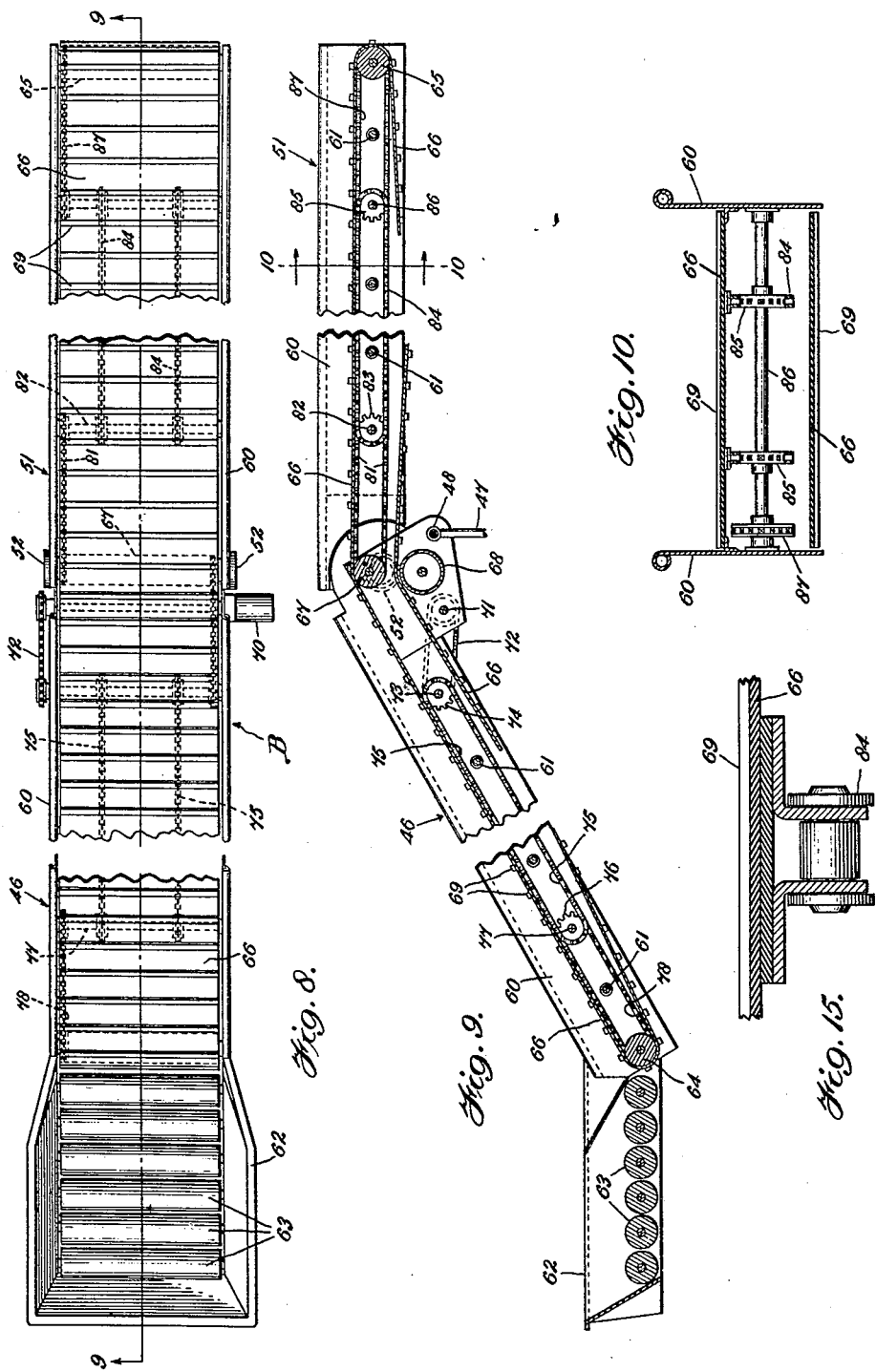

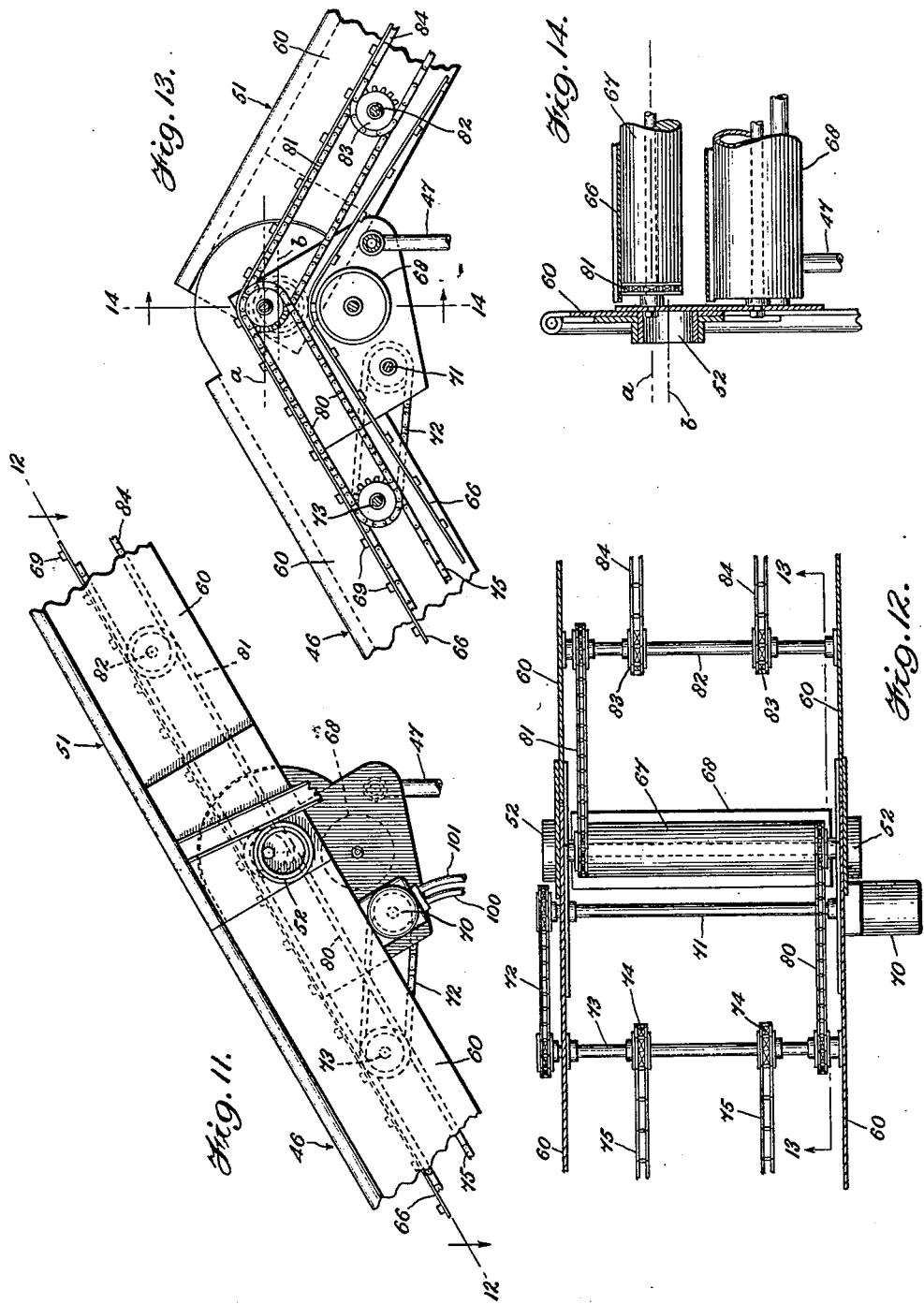

United States Patent Office 3,067,858
Patented Dec. 11, 1962

3,067,858
MOBILE CONVEYING APPARATUS FOR PILING OR STACKING COMMODITIES
Stanley Loosli, Ashton, Idaho
Filed May 1, 1961, Ser. No. 106,792
13 Claims. (Cl. 198—126)

This invention relates to mobile elevating conveyers of a type commonly employed in the piling or stacking of various commodities, such for example, as loose or sacked vegetables, grain, hay, silage, boxes and crates, etc., and has for one of its objects the provision of an apparatus of this character which will be extremely maneuverable and versatile in use. To this end the present machine embodies an improved power-driven wheeled chassis or mobile supporting unit upon which is mounted an elevating conveyer unit comprising a plurality of longitudinally alined sections one of which (constituting the product receiving and elevating leg) is vertically translationally mounted upon the chassis in an inclined position, while the other section (constituting the distributing or discharge leg) is hingedly connected to the upward end of said elevating leg for vertical angular disposition in relation thereto.

The product supporting and transporting element of the conveyer unit comprises a single endless belt extending from the receiving end of the elevating leg to the outward end of the discharge leg, which belt is power-driven by means which engage and support the active run thereof throughout substantially its entire length. The vertical translational movements of the conveyer unit relative to the chassis, the vertical angular adjustments of the discharge leg of the conveyer relative to the receiving leg, the drive of the chassis wheels to effect movement of the entire apparatus over the ground, as well as the drive of the conveyer belt, are each effected by independent power means which are volitionally controllable by the attendant from a single control station. Steering of the chassis also is controlled from this point. Preferably, although not necessarily, the several motors which are utilized for effecting the various operations of the parts are of a hydraulic type, with all of them being supplied with pressurized fluid emanating from a single power-driven pump mounted on the machine.

One exemplification of the aparatus is illustrated in the accompanying drawings constituting a part of this specification, and in which:

FIGURE 1 is a side elevational view of the machine with the conveyor unit as a whole in its lowered position, and with the discharge leg of said unit in an intermediate position in relation to the receiving leg thereof;

FIG. 2 is a similar view illustrating the conveyor unit as a whole in an elevated position, and with the maximum angular adjustments of the discharge leg relative to the receiving leg being shown in full and broken lines respectively;

FIG. 6 is a still further enlarged sectional-plan view of a portion of the chassis unit, showing the control station of the machine;

FIG. 7 is an enlarged fragmentary sectional-elevational view on approximately the plane indicated by the line 7—7 in FIG. 5, looking in the direction of the arrows;

FIG. 8 is a plan view, partly broken away, of the conveyer unit as a whole;

FIG. 9 is a longitudinal vertical sectional view of the unit shown in FIG. 8, on the plane indicated by the line 9—9 in such figure;

FIG. 10 is an enlared transverse sectional view on the plane indicated by the line 10—10 in FIG. 9, looking in the direction of the arrows;

FIG. 11 is a fragmentary side elevational view of the hinged portion of the two legs of the conveyer unit, with the discharge leg being shown in its maximum upward position;

FIG. 12 is a sectional-plan view of the parts shown in FIG. 11, on approximately the plane indicated by the line 12—12 therein, looking down;

FIG. 13 is a longitudinal sectional view on approximately the plane indicated by the line 13—13 in FIG. 12, looking in the direction of the arrows, the discharge leg however, being shown in its lowered position;

FIG. 14 is a transverse vertical sectional view on approximately the plane indicated by the line 14—14 in FIG. 13, looking in the direction of the arrows;

FIG. 15 is a fragmentary detail cross-sectional view illustrating the engagement between the conveyer belt and one of its supporting and driving chain elements; and FIG. 16 is a diagrammatic view illustrating the hydraulic system.

Figure 3:
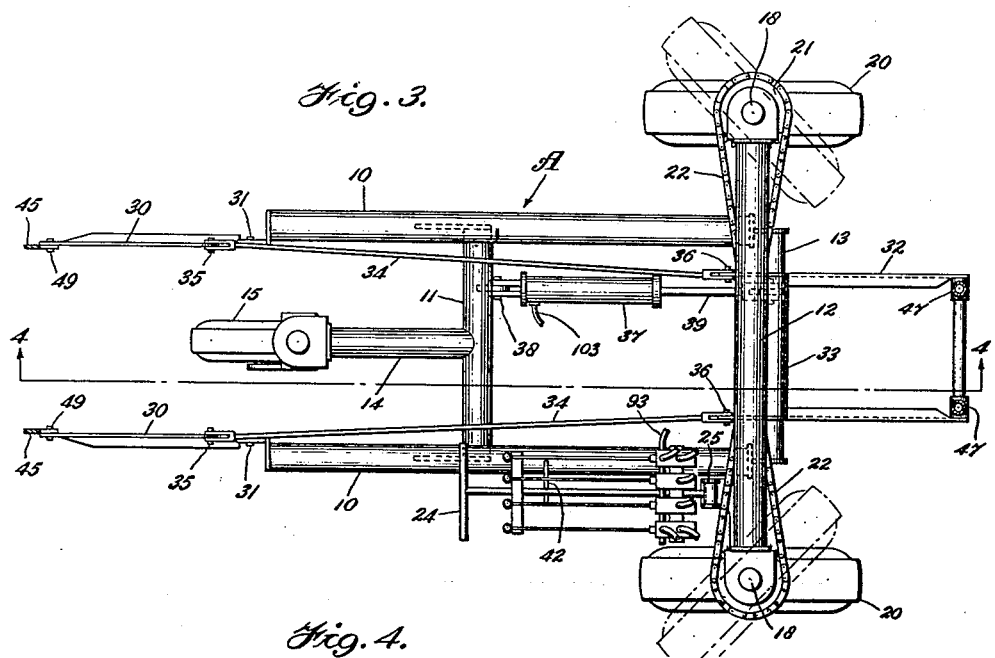
FIG. 3 is a plan view, on an enlarged scale, of the mobile chassis unit per se.
Figure 4:
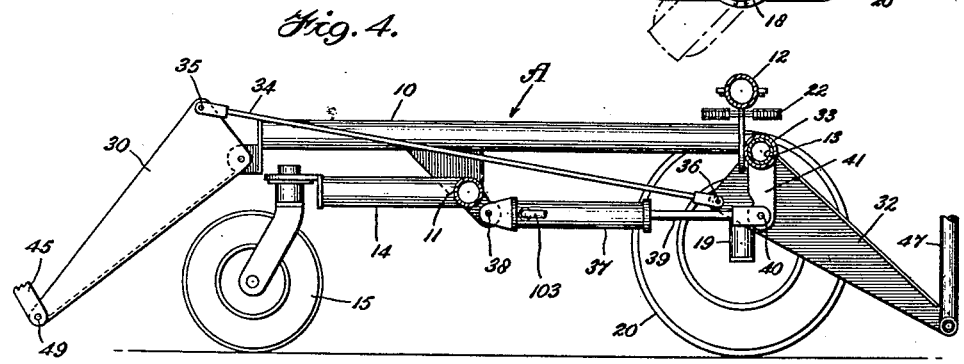
FIG. 4 is a longitudinal sectional-elevational view of the parts shown in FIG. 3, on the plane indicated by the line 4—4 in such figure, looking in the direction of the arrows.
Figure 5:
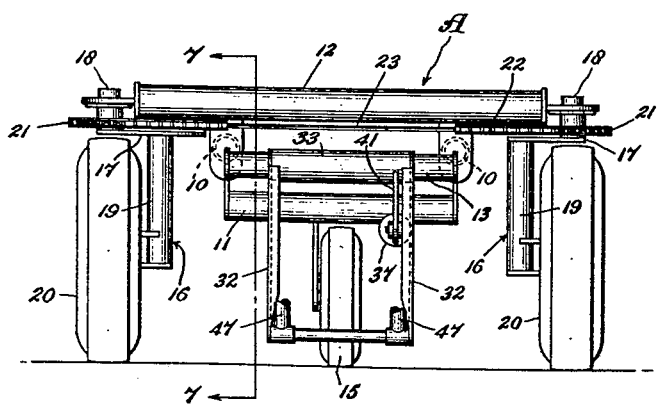
FIG. 5 is an end elevational view of the chassis unit as seen from the right of FIG. 4.

Referring first more particularly to FIGS. 1–7, the apparatus comprises a mobile chassis unit A upon which the conveyer unit B is mounted for vertical movements of translation. As here shown, the chassis unit is constructed largely of tubular elements, including a pair of longitudinally extending members 10 which are maintained in transversely spaced relation by cross members 11, 12 and 13 rigidly connected therewith. To the cross member 11 there is rigidly attached a longitudinally extending member 14 the rearward end of which pivotally mounts a caster wheel 15, while each end of the cross member 12 carries a wheel mounting assembly comprising a horizontal plate member 17 which is oscillatably mounted on the member 12 by means of a king pin 18. Each plate member 17 is provided with a depending member 19 the lower end of which carries a stub axle (not shown) mounting a forward chassis-supporting wheel 20.

Each plate 17 also has secured to it a sprocket wheel 21 and, as best shown in FIGS. 3 and 6, a length of sprocket chain 22 is trained about each such sprocket. The ends of the respective chains 22 are cross-connected by rods or cables 23 whereby movement of one sprocket in either direction will be transmitted to and produce corresponding movement of the companion sprocket in an opposite direction. Such movements may be imparted to the sprocket 21 shown in FIG. 6 by means of a manually operable handle 24 pivotally attached to the plate 17 at 25, and thus the wheels 20 may be caused to assume various angular relationships to one another, as indicated by full and broken lines in FIGS. 3 and 6, with resultant control of the direction of movement of the machine over the ground by the attendant.

The ground movements of the machine are induced by a reversible hydraulic motor 26 (see FIG. 7) disposed adjacent one of the wheels 20 and having a sprocket or gear on its output shaft normally engaged with a chain or gear 27 carried by said wheel. Preferably the motor 26 is mounted on a member 28 which is arcuately adjustably carried by the wheel-mounting member 19, whereby through adjustment of said member 28 to its broken line position shown in FIG. 7 the connection between the motor 26 and gear 27 may be broken, which is desirable when the machine is to be towed a considerable distance from one operating location to another.

The wheels 20 normally are disposed in the substantially parallel relationship shown in full lines in FIG. 3, being retained in such positions by engagement of the handle 24 with a stop or catch 42 carried by the adjacent frame member 10. With said wheels in such positions, actuation of the motor 26 will result in the chassis unit A moving forwardly or rearwardly (depending upon the direction of motor rotation) in a substantially straight line; but if the handle 24 be disengaged from the catch 42 and manually swung counterclockwise (as indicated in broken lines in FIG. 6) the wheels 20 are thereby adjusted to angular positions relative to one another such as shown in broken lines in FIGS. 3 and 6, whereupon actuation of the motor 26 will cause the chassis to swing arcuately about the caster wheel 15 as a pivot. Should adjustment of the wheels 20 be continued until they are disposed in a transversely alined position, i.e., each at 90° to the full line positions of FIG. 3, motor actuation will result in substantially straight line lateral movement of the chassis in one direction or the other. With such versatility of movement, the machine may be easily and quickly spotted in relation to various commodity receiving and/or discharging points.

The rearward end of each longitudinal frame member 10 has a rearwardly extending bell-crank arm 30 pivotally secured to it as at 31, while at the forward end of the chassis there is a forwardly extending arm structure comprising a pair of bell-crank levers 32 which are journaled on the transverse frame member 13 by means of a sleeve 33 to which such levers are rigidly attached. The arm structures 30 and 32 are interconnected by reach rods 34 pivotally connected to said arm structures at 35 and 36 respectively, whereby movements imparted to the bell-cranks 32 will be transmitted to and cause equal and opposite movements of the bell-cranks 30. Such movements may be produced by a hydraulic ram 37 the cylinder of which is pivotally mounted by the cross frame member 11 at 38, while its piston rod 39 is pivotally connected at 40 to an ear 41 rigidly secured to and depending from the sleeve 33 to which the bell-cranks 32 are connected.

The conveyer unit B of the machine is mounted upon and supported by the arm structures 30 and 32 of the chassis unit, such mounting being effected by straps 45 attached ot the rearward portion of the receiving leg 46 of said conveyer unit, and by adjustable upright standards 47 pivotally connected at 48 to the forward portion of said leg. The straps 45 are pivotally connected to the bell-crank arms 30 at 49, while the standards 47 are pivotally connected at 50 to the arms 32, and thus as the bell-cranks are swung upwardly by the ram 37 the conveyer unit will be bodily elevated from the position shown in FIG. 1 to that shown in FIG. 2, or to any desired position intermediate the two. The said ram may be single acting since the weight of the conveyer unit is such as to effect the lowering thereof as fluid pressure in the ram cylinder is relieved.

The parts are so constructed and assembled that the receiving leg 46 of the conveyer unit is at all times disposed in an inclined position, substantially as illustrated in FIGS. 1 and 2, although the precise angle of inclination may be varied as necessary or desired by preliminary lengthening or shortening of the adjustable standards 47. The discharge leg 51 of the conveyer unit has its rearward end pivotally connected at 52 to the forward end of the receiving leg 46 of said unit, and adjustment of said leg 51 relative to the leg 46 between the full- and broken-line positions shown in FIG. 2 is effected by a pair of hydraulic rams 53 (one at each side of the unit) the cylinders of which are pivotally attached at 54 to the frame of the leg 46, while their piston rods 55 are connected at 56 to a bracket structure 57 which is rigidily carried by the frame of leg 51. Here again the rams 53 may be single acting and adapted only to raise the leg 51 since its weight will effect lowering thereof when the fluid pressure in the ram cylinders is reduced.

The detail construction of the conveyer unit B will be best understood from FIGS. 9–15, from which it will be seen that each of the legs 46 and 51 thereof comprises side frame members 60 which are maintained in transversely spaced relation by cross rods or bars 61. At its lower or receiving end the leg 46 is provided with a hopper 62 for receiving the commodity to be handled and supplying it to said leg. As here shown, the bottom of this hopper is formed by a plurality of adjacent freely mounted rolls 63, although for some commodities other forms of hopper bottom construction may be employed.

A belt pulley or roller 64 is rotatably mounted between the side frame members 60 adjacent the juncture of the hopper 62 with the leg 46, while a similar pulley or roller 65 is mounted at the outward end of the leg 51. A single endless belt 66, of rubber, rubberized fabric, or other suitable material, is trained about the rollers 64 and 65, and adjacent the hinge connection 52 between the two legs there is provided a bend pulley or roll 67 engageable by the upper or active run of the belt. An idler roll 68 is also provided for supporting the lower or return run of the belt in the region of leg articulation. The belt 66 preferably is provided with transverse cleats 69 to prevent or minimize slippage between the belt and commodities placed thereon, particularly during travel along the inclined leg 46.

Driving of the conveyer belt 66 is accomplished by a hydraulic motor 70 mounted on the upper end portion of the inclined conveyer leg 46, which motor drives a shaft 71 (FIG. 12) that is connected by a chain-and-sprocket drive 72 to a cross shaft 73 disposed intermediate the upper and lower runs of the belt. The said shaft 73 carries the transversely spaced sprockets 74 about which are trained sprocket chains 75 that extend to and engage companion sprockets 76 carried by a cross shaft 77 disposed toward the lower end of the leg 46, and which shaft in turn drives the lower belt pulley or roller 64 through a chain-and-sprocket drive 78.

The upper cross shaft 73 of the leg 46 also drives the bend roller 67 at the articulating connection between the legs, by means of a chain-and-sprocket drive 80 (FIGS. 12 and 13), and through the medium of a chain-and-sprocket drive 81 the said roller drives a cross shaft 82 mounted by the leg 51 of the conveyer adjacent its hinge connection with leg 46. The shaft 82 carries sprockets 83 about which are trained sprocket chains 84 that extend to and engage sprockets 85 carried by a cross shaft 86 adjacent the outward or discharge end of the leg 51, and this shaft drives the outward belt roller or pulley 65 through a chain-and-sprocket drive 87. It will be noted from FIGS. 9, 11 and 13 that the chains 75 and 84 are so disposed in relation to the conveyer belt 66 that the upper or active run of such belt rests upon the upper runs of said chains, whereby the belt run is supported and driven by the chains throughout virtually its entire length. This support and drive of the belt appreciably reduces tension and wear-and-tear thereon such as would occur were the belt driven only through the medium of one or more of the rollers 64, 65 and 67.

As best shown in FIGS. 11, 13 and 14, the axis of rotation of the bend roller 67 is disposed somewhat eccentrically with respect to the axis of articulation between the two conveyer legs provided by the pivot structure 52; in other words, the axis $a$ of the roller is somewhat above the axis $b$ of said pivot structure. It results from this that a substantially uniform tension is maintained upon the belt in all angular relationships of the leg 51 to the leg 46.

The pressurized operating fluid for the several motors 26, 37, 53 and 70 described above is supplied by a suitable pump 90 (FIGS. 1 and 2) mounted in a housing 91 carried by the leg 46 of the conveyer unit, which pump may be constantly driven by an electric motor, internal combustion engine, or other appropriate source of power 92. Fluid from said pump is conducted by flexible supply and return conduits 93 and 94 to and from a battery of manually controllable valves 95, 96, 97 and 98, conveniently mounted on the steering handle 24 by a supporting bar 99 (FIGS. 3, 6 and 7). With this arrangement individual control of the several motors, as well as steering of the machine, may be effected by the attendant from a single control station. The valve 95 is connected by conduits 100 and 101 with the conveyer belt driving motor 70; the valve 96 is connected by a conduit 102 with the rams 53 which elevate the discharge leg 51 of the conveyer unit; the valve 97 is connected by a conduit 103 to the ram 37 which effects translational elevation of the entire conveyer unit relative to the chassis unit; while the valve 98 is connected by the conduits 104 and 105 with the wheel driving motor 26. The said valves may be of any appropriate conventional construction.

What is claimed is:

1. Mobile apparatus for piling or stacking materials, comprising a wheeled chassis; a linear power-driven conveyer unit; a plurality of vertically swingable arm structures pivotally mounted on said chassis, said arm structures being connected to and supporting a portion of said conveyer unit in an inclined position above the chassis; means connecting said arm structures for simultaneous co-ordinated swinging movements whereby they impart only movements of translation to the conveyer unit; and volitionally controlled power means arranged to swing said arm structures whereby to translationally dispose the conveyer unit in various elevated positions relative to the chassis with the inclination thereof maintained in all such positions.

2. Mobile apparatus for piling or stacking materials, comprising a wheeled chassis; a linear power-driven conveyer unit; a vertically swingable arm structure pivotally mounted on each end portion of said chassis, said arm structures extending in opposite directions from the chassis and being connected to a portion of the conveyer unit whereby to support the latter in an inclined position above the chassis; co-ordinating connections between said arm structures arranged to effect simultaneous movements thereof in opposite directions, whereby they impart only vertical movements of translation to the conveyer unit; and volitionally controlled power means arranged to swing said arm structures whereby to translationally dispose the conveyer unit in various elevated positions relative to the chassis with the inclination thereof maintained in all such positions.

3. Mobile apparatus for piling or stacking materials, comprising a wheeled chassis; a power-driven endless conveyer unit having a pair of articulated legs; a vertically swingable arm structure pivotally mounted on each end portion of said chassis, said arm structures being each connected to one of said conveyer legs whereby to support the same in an inclined position above the chassis; connections between said arm structures arranged to coordinate the swinging movements thereof whereby they impart only vertical movements of translation to the conveyer unit; volitionally controlled power means arranged to swing said arm structures whereby to translationally dispose said conveyer unit leg in various elevated positions relative to the chassis with the inclination of such leg being maintained substantially constant at all times; and power means connected to the other leg of said conveyer unit for volitionally adjusting the position of such other leg relative to the first leg.

4. Mobile apparatus for piling or stacking materials, comprising a wheeled chassis and a power-driven conveyer unit, said unit comprising a pair of longitudinally alined articulated leg structures one of which is mounted upon said chassis in an inclined position, and each of which is provided with a sprocket-carrying shaft adjacent each of its ends; endless strands of sprocket chain trained about the sprockets of each of said leg structures; a single endless material-carrying belt extending from end to end of the two leg structures and disposed with its upper run resting upon and in frictional power-transmitting engagement with the chains of the respective structures; power means arranged to drive the sprockets of the respective leg structures; and means for volitionally altering the vertical angular relationship between the two leg structures.

5. Piling or stacking apparatus according to claim 4, wherein the outward end portion of each of the conveyer leg structures is provided with a pulley disposed beyond the sprockets at such ends, about which pulleys the material-carrying belt is trained, and said power means is arranged to also drive such pulleys.

6. Piling or stacking apparatus according to claim 4, wherein the inclined conveyer leg structure is provided adjacent the articulating connection between the two leg structures with a bend pulley engageable by the upper run of the material-carrying belt, the rotative axis of such bend pulley being disposed eccentrically with respect to the axis of articulation of the leg structures, whereby tension in said belt may be maintained substantially constant in all angular relationships of the two leg structures.

7. In an apparatus including a chassis, and a member supported by the chassis, an apparatus mounting the member on the chassis for elevational movement with respect thereto while maintaining said member in substantially predetermined attitude with respect to the chassis comprising a pair of arms pivotally mounted in the chassis for movement about substantially parallel axes and oppositely substantially horizontally extended from their respective axes, means interconnecting the arms for pivotal movement in opposite rotational directions about their axes, means pivotally connecting the extended end of one arm to said member at a fixed position thereon, and a substantially erect standard pivotally connected to the extended end of the other arm and to said member in supporting relation to the latter.

8. In an apparatus including an elongated chassis and an elongated member supported by the chassis, an apparatus mounting the member on the chassis for adjustable elevational movement in substantially predetermined attitude relative to the chassis comprising a pair of bell cranks pivotally mounted on the chassis for movement about substantially parallel axes and oppositely extended from their respective axes, means independently pivotally interconnecting the extended end of each bell crank and said member and supporting the member on the bell cranks, powered means mounted on the chassis and connected to one of the bell cranks adapted to pivot said bell crank relative to the frame to raise and to lower the member at its point of support by said bell crank, and a push-pull link pivotally interconnecting the bell cranks eccentrically of their pivotal axes and on opposite sides thereof whereby the bell cranks pivot in opposite rotational directions about their respective axes.

9. In an apparatus including a chassis, and a member supported by the chassis, a apparatus mounting the member on the chassis for elevational movement while maintaining said member in substantially predetermined attitude with respect to the chassis comprising a pair of bell cranks of substantially equal length pivotally mounted on the chassis for movement about substantially parallel axes and oppositely substantially horizontally extended from their respective axes, a push-pull link pivotally connected to one of the bell cranks above its respective axis and to the other bell crank below its respective axis, powered means connected to one of the bell cranks adapted to impart controlled rotation thereto and through the push-pull link opposite rotation to the other bell crank, means pivoally connecting the extended end of one bell crank to said member at a fixed position in relation thereto, and a substantially erect standard pivotally connected to the extended end of the other bell crank and to the member in supporting relation to the latter.

10. In an apparatus including a chassis, and a member supported by the chassis, an apparatus mounting the member on the chassis for elevational movement while maintaining said member in substantially predetermined attitude with respect to the chassis comprising a plurality of bell cranks of substantially equal length, means pivotally mounting the bell cranks for pivotal movement about a pair of substantially horizontal axes in axially spaced relation on their respective axes, the pair of axes being in substantially parallel horizontally spaced relation and the bell cranks being substantially horizontally oppositely extended from their respective axes, means interconnecting the bell cranks on the separate axes for pivotal movement in opposite rotational directions about their respective axes, means pivotally connecting the extended ends of the bell cranks of one axis to the member at fixed positions thereon, and substantially erect standards pivotally connected to the extended ends of the bell cranks of the opposite axis and to said member at positions spaced horizontally from the connection of the bell cranks of said one axis thereto substantially equal to the horizontal spacing between the points of connection of the opposite pairs of bell cranks respectively to the member and to the standards said spacing being measured when the member is at a position of minimum elevation afforded by the apparatus.

11. A mobile piler comprising a chassis, means mounting the chassis for earth traversing movement, two pairs of bell cranks of substantially equal length, means pivotally mounting the bell cranks of each pair for pivotal movement about a substantially horizontal axis individual to the pair, the axes of the two pairs being in substantially parallel horizontally spaced relation and the pair of bell cranks being substantially horizontally oppositely extended from their respective axes, means interconnecting the bell cranks for pivotal movement in opposite rotational directions about their respective axes, an elongated inclinded conveyor unit having relative upper and lower end portions, means pivotally connecting the lower end portion of the conveyor unit to the extended ends of one pair of the bell cranks, and a pair of substantially erect standards pivotally connected to the extended ends of the opposite pair of bell cranks and to the upper end portion of the conveyor unit.

12. A mobile piler comprising a chassis, means mounting the chassis for earth traversing movement, two pairs of bell cranks of substantially equal length, means pivotally mounting the bell cranks of each pair for pivotal movement about a substantially horizontal axis individual to the pair, the axes of the two pairs being in substantially parallel horizontally spaced relation and the pairs of bell cranks being substantially horizontally oppositely extended from their respective axes, means interconnecting the bell cranks for pivotal movement in opposite rotational directions about their respective axes, an elongated inclined conveyor unit having relative upper and lower end portions, means pivotally connecting the lower end portion of the conveyor unit to the extended ends of one pair of the bell cranks, a pair of substantially erect standards pivotally connected to the extended ends of the opposite pair of bell cranks and to the upper end portion of the conveyor unit, a second conveyor unit pivotally connected to the upper end portion of the inclined conveyor unit for elevational swinging movement, a bracket rigidly mounted on the second conveyor unit, and an extensible and contractible ram pivotally interconnecting the inclined conveyor unit and the bracket for controlled pivotal positioning of the second conveyor unit.

13. The apparatus of claim 7 in which the standard is telescopically adjustable.

References Cited in the file of this patent

UNITED STATES PATENTS

| | | |
|---|---|---|
| 2,631,715 | Vickers | Mar. 17, 1953 |
| 2,778,477 | Lundahl | Jan. 22, 1957 |
| 2,868,356 | Haaf | Jan. 13, 1959 |